United States Patent Office 3,007,959
Patented Nov. 7, 1961

3,007,959
ESTERIFICATION OF TEREPHTHALIC ACID IN THE PRESENCE OF CADMIUM SULFATE CATALYST
Delbert H. Meyer, Highland, Ind., assignor to Standard Oil Company, Chicago, Ill., a corporation of Indiana
No Drawing. Filed Jan. 22, 1959, Ser. No. 788,275
2 Claims. (Cl. 260—475)

This invention relates to the esterification of aromatic carboxylic acids with primary aliphatic alcohols. More particularly, the invention relates to an improved catalyst for this reaction.

Esters of aliphatic alcohols and aromatic carboxylic acids are widely used in industry, particularly as plasticizers and as intermediates in the preparation of polyester resins. The rate of esterification is usually quite slow and catalysts have been used to increase this reaction rate. The commonly used active catalysts such as sulfuric acid, hydrochloric acid, and aluminum sulfate promote a very rapid reaction but have the serious drawback in that considerable alcohol is lost by ether formation.

An object of the invention is a catalytic process for esterifying aromatic carboxylic acids with primary aliphatic alcohols. A particular object of the invention is a catalytic process for esterification of aromatic carboxylic acids with primary aliphatic alcohols wherein there is no significant loss of alcohol to ether formation. Other objects will become apparent in the course of the detailed description.

In accordance with the objects above, it has now been discovered that rapid esterification reaction rates may be achieved without incurring the penalty of high ether formation by conducting the esterification of aromatic carboxylic acids (or anhydrides thereof) with primary aliphatic alcohols in the presence of a cadmium sulfate catalyst. The cadmium sulfate may be anhydrous $CdSO_4$ or any of the various hydrates of cadmium sulfate, such as $CdSO_4 \cdot 4H_2O$ or $3CdSO_4 \cdot 8H_2O$.

The improved catalyst of this invention is useful in increasing the reaction rate of all aromatic carboxylic acids or anhydrides thereof with primary aliphatic alcohols which contain from 1 to about 16 carbon atoms. Examples of suitable aromatic carboxylic acids are: benzoic, toluic, phthalic, phthalic anhydride, isophthalic, terephthalic, trimesic, trimellitic, trimellitic anhydride, hemimellitic, hemimellitic anhydride, prehnitic, mellitic, naphthoic, naphthalic anhydride, diphenic, diphenic anhydride. Suitable primary aliphatic alcohols are: methanol, ethanol, n-propanol, n-butanol, isobutyl, n-hexyl, n-octyl, lauryl, myristyl (n-dodecyl), cetyl (n-hexadecyl), isooctyl ($C_8$ Oxo), nonyl ($C_9$ Oxo), decyl ($C_{10}$ Oxo) and tridecyl ($C_{13}$ Oxo). As used herein Oxo alcohols are understood to be the product of the reaction of an olefin or mixture of olefins with carbon monoxide and subsequent hydrogenation of the aldehydes formed in the oxoadtion reaction. Many of these Oxo alcohols are now commercial products; the 8, 9, 10 and 13 carbon atom containing mixture of alcohols derived from a mixture of $C_7$, $C_8$, $C_9$ and $C_{12}$ olefin isomers respectively are available as isooctyl alcohol, nonyl alcohol, decyl alcohol and tridecyl alcohol, respectively. The catalyst of the instant invention is particularly suitable for reacting phthalic acids with methanol.

Although it is to be understood that the cadmium sulfate catalyst of the invention is suitable for use with the defined acids and alcohols at various well known conditions of temperature, time of reaction, and ratios of alcohol to acid in the starting reaction mixture, for completeness a summary of operating conditions is set out herein. The esterification reaction is ordinarily conducted at a temperature between about 140° C. and 350° C. The reaction is carried out until the desired degree of conversion of carboxyl groups or equilibrium condition has been reached. This time is dependent upon the particular acid and particular alcohol present in the reaction zone. In general, the higher the temperature maintained in the reaction zone the shorter the time needed to reach the desired degree of carboxyl group conversion or equilibrium condition.

Theoretically only 1 mol of alcohol is needed for each mol of carboxyl groups to be esterified, however the degree of conversion and the conversion rate are improved by the presence of excess alcohol in the reaction zone. In general between about 2 and 30 mols of alcohol are present in the reaction zone per mol of carboxyl groups to be esterified.

The amount of catalyst present may be very small, for example 0.0005 weight percent based on aromatic acid or anhydride charged to the reaction zone. Or the amount used may be quite large amounting to five or more weight percent based upon acid or anhydride charged. When operating with terephthalic acid and methanol the catalyst usage is generally between about 0.01 and 0.5 weight percent based on terephthalic acid.

As a specific illustration of a preferred embodiment of the invention, conditions for esterifying terephthalic acid with methanol are described. The terephthalic acid and methanol are charged to the reaction zone in a weight ratio of methanol to acid of between about 2 and 5; this corresponds to between 10 and 26 mols of methanol per mol of terephthalic acid charged. It is preferred to carry out the esterification reaction at a temperature between about 240° C. and 300° C. The amount of catalyst present appears to have no significant effect on the reaction rate as long as some catalyst is present. A carboxyl group conversion of about 90–95% of equilibrium is attained in a time of between about 10 minutes and 60 minutes, with the longer times corresponding to lower temperatures.

Various illustrative embodiments of the present invention are set forth in the examples below.

EXAMPLES

Studies were made on the degree of conversion of terephthalic acid and methanol at various temperatures and times without and with catalyst of the invention present in the reaction zone. The catalyst was anhydrous cadmium sulfate. These studies were carried out using as the reaction zone a glass tube having about 13.5 ml. volumetric space. The terephthalic acid and catalyst were weighed and the methanol was delivered volumetrically using a hypodermic syringe. The glass tube was then sealed by fusing the opening. The sealed tube was placed in a constant temperature bath provided with a rocking and oscillating mechanism which mechanism kept the contents of the tube well intermingled. After the reaction zone had been agitated in the bath for the desired time it was removed from the bath and allowed to cool rapidly to room temperature. After the tube had reached room temperature it was opened and the contents transferred to a beaker; the tube was washed with 100 ml. of ethyl alcohol and 100 ml. of benzene to insure removal of all the material therefrom. The degree of conversion of the carboxyl groups to ester groups was determined by titration with 0.02 normal aqueous sodium hydroxide using phenol red as the indicator; when it was believed that the conversion would be low, by presence of considerable solid material in the tube, the titration was carried out with 0.1 normal sodium hydroxide.

The presence of even small amounts of dimethyl ether in the tube is readily detected by the presence of pressure within the tube when the tube is opened. Escaping gaseous material at the moment of opening the tube is quite apparent. Using this method of observation it is believed that no dimethyl ether was formed during the tests made and reported herein.

The results of several tests are reported in the table. In the first two tests 3 parts by weight of methanol were present for each part of terephthalic acid (TPA). These two tests were carried out at about 260° C. and for 64 minutes in order to compare the extent of esterification at a time equivalent to the usual commercial batch esterification time.

Tests 3-6 were conducted at the higher temperature of 260° C. and with a 4:1 methanol-acid ratio, but with only one-fourth the catalyst of Test 2.

Table

| Test No. | Reactants, Parts by Wt. | | CdSO$_4$, Wt. percent on Terephthalic Acid | Temp., °C. | Time min. | Carboxyl Grps. Converted, percent |
|---|---|---|---|---|---|---|
| | Methanol | Terephthalic Acid | | | | |
| 1 | 3 | 1 | None | 210 | 64 | 39 |
| 2 | 3 | 1 | 1 | 211 | 64 | 77 |
| 3 | 4 | 1 | 0.25 | 260 | 5 | 45.5 |
| 4 | 4 | 1 | 0.25 | 260 | 10 | 68.5 |
| 5 | 4 | 1 | 0.25 | 260 | 20 | 78.2 |
| 6 | 4 | 1 | 0.25 | 260 | 30 | 87 |

Test 2, employing the improved catalyst of the invention, shows that 77% of the carboxyl groups were converted whereas, under the same conditions in Test 1 but omitting the catalyst, the conversion was only 39%.

Tests 3-6, which were conducted at 260° C., but with only one-fourth the catalyst, show that cadmium sulfate gives appreciable conversion in only 5 minutes. Moreover, the conversion rate remains high during even the latter portions of the runs.

I claim:
1. In a process for preparing dimethyl terephthalate by reacting terephthalic acid with methanol at a temperature between about 140° C. and 350° C. and at a pressure of at least about atmospheric, the improvement which comprises carrying out said reaction in the presence of a cadmium sulfate catalyst.

2. A process for preparing dimethyl terephthalate which comprises heating terephthalic acid and methanol, in a weight ratio of methanol to acid of between about 2 and 5, at a temperature between about 240° C. and 300° C., in the presence of between about 0.01 and 0.5 weight percent, based on reactants, of cadmium sulfate, for a time between about 10 minutes and 60 minutes, and separating dimethyl terephthalate from unreacted charge and other conversion products.

References Cited in the file of this patent
UNITED STATES PATENTS

| 2,491,660 | Gresham | Dec. 20, 1949 |
| 2,828,290 | Caldwell | Mar. 25, 1958 |
| 2,850,483 | Ballentine et al. | Sept. 2, 1958 |

FOREIGN PATENTS

| 879,715 | France | Nov. 30, 1942 |

OTHER REFERENCES

Groggins: "Unit Processes in Organic Synthesis," p. 702, McGraw-Hill, 1958.